United States Patent [19]
Vicard

[11] Patent Number: 5,764,761
[45] Date of Patent: Jun. 9, 1998

[54] ELETRONIC ASSEMBLY WITH INTEGRATED CIRCUIT DEVICES INCLUDING LOCK CIRCUITRY

[75] Inventor: Dominique Vicard, Crolles, France

[73] Assignee: Hewlett-Packard Company, Palo Alto, Calif.

[21] Appl. No.: 646,165

[22] Filed: May 7, 1996

[30] Foreign Application Priority Data

May 18, 1995 [EP] European Pat. Off. .......... 95410048

[51] Int. Cl.⁶ .......................................... H04K 1/00
[52] U.S. Cl. .......................................... 380/4; 380/25
[58] Field of Search .................. 380/3, 4, 23, 25

[56] References Cited

U.S. PATENT DOCUMENTS

| | | | |
|---|---|---|---|
| 5,231,668 | 7/1993 | Kravitz . | |
| 5,293,610 | 3/1994 | Schwarz | 380/3 |
| 5,377,264 | 12/1994 | Lee et al. | 380/4 |
| 5,379,344 | 1/1995 | Larsson et al. | 380/23 |
| 5,428,685 | 6/1995 | Kadooka et al. | 380/25 |
| 5,432,950 | 7/1995 | Sibigtroth | 380/3 |
| 5,467,396 | 11/1995 | Schossow et al. | 380/4 |
| 5,495,531 | 2/1996 | Smiedt | 380/4 |
| 5,530,749 | 6/1996 | Easter et al. | 380/3 |
| 5,619,573 | 4/1997 | Brinkmeyer et al. | 380/23 |

FOREIGN PATENT DOCUMENTS

0566512 A1  4/1993  European Pat. Off. .

OTHER PUBLICATIONS

Electronics Week, vol. 58, No. 7, Feb. 1985, pp. 68–72, J. S. Kontur et al., "Locking Up System Security".
Mini–Micro Conference Record, 11 Nov. 1983, pp. 1–11, B. Huston, "New ICs Help Prevent Software Theft".
Computer, vol. 25, No. 1, Jan. 1992, pp. 39–52, T. Y. C. Woo et al., "Authentication for Distributed System".
European Search Report, EP 95 41 0048, 8, Nov. 1995.

*Primary Examiner*—David C. Cain

[57] ABSTRACT

In an electronic assembly, a first integrated circuit device (chip) is provided with a lock circuitry that controls operational enablement of a functional block of the chip. To unlock the lock circuitry, a "chip-key" must be supplied to the chip. The chip is also provided with chip-key output circuit for outputting a chip key associated with one or more other chips of the electronic assembly; the chip-key output circuit may be part of the functional block controlled by the lock circuitry of the same chip.

9 Claims, 4 Drawing Sheets

ELETRONIC ASSEMBLY WITH INTEGRATED CIRCUIT DEVICES INCLUDING LOCK CIRCUITRY

FIELD OF THE INVENTION

The present invention relates to an electronic assembly with integrated circuit devices that include lock circuitry.

BACKGROUND OF THE INVENTION

Various techniques are known for ensuring that only authorised persons can gain operational access to a computer. For example, a computer may offer password protection whereby upon power on of the computer or following activation of password protection (for example, when a user temporarily goes away from the computer), a predetermined password must be entered before the operational capabalities of the computer are restored. Such a system may operate, for example, by deactivating the keyboard controller until the correct password is input.

It is also known to adjust the computer resources available to a user according to the user's authorisation level; this is generally achieved by having the user identify himself/herself to the computer with this identify being authenticated by subsequent input of a user-specific password.

In fact, both the foregoing arrangements provide only very limited protection for the computer resources in the situation where a person intending to gain unauthorised access (herein referred to as an intruder) has physical access to the inside of the computer. For example, in the case of password protection inhibiting the keyboard controller, it is really only the keyboard that is disabled and an intruder with internal physical access to the computer can readily bypass the keyboard and use the other computer resources. The same is true where access to certain resources is password protected as such protection is software implemented by the computer's main processor and an intruder with internal physical access can, for example, readily access a supposedly protected hard disc drive.

One approach to dealing with this problem has been to reduce the possibility of an intruder gaining internal physical access to the computer. For example, it is common to provide physical locks on computer cases. More sophisticated approaches are also known, though generally in the context of protecting highly sensitive data; thus, it is known to provide tamper-proof enclosures for encryption/decryption modules storing encryption/decryption keys, any attempt to open the module resulting in destruction of the keys. This latter approach to providing a defense against internal physical tampering, whilst effective, is generally very expensive and is not suitable for general application.

It is an object of the present invention to provide a general approach to protecting resources in electronic equipment that may be physically accessible to unauthorised users, but which does not require the use of a special tamper-proof enclosure.

SUMMARY OF THE INVENTION

In general terms, the present invention envisages controlling the use of the functionality provided by a plurality of integrated circuit devices (for example, associated with different resources) by requiring each of the devices to be provided with a corresponding password ("chip key") and arranging for this to be done by having a first one of the devices, once itself enabled by its chip key, initiate the passing of the appropriate chip keys to the other devices.

With such an arrangement, an intruder having internal physical access to an item of equipment cannot access the resources incorporating the controlled devices whilst an authorised user need only input a single password to unlock the functionality of all resources he/she is authorised to use.

The principle of having one device enable another can also be used to ensure that only certain specific devices or device types are used together. Thus if a device receiving a chip key from another is not the intended mate to the device outputting the chip key, then it can be arranged that the chip key concerned is ineffective to enable the receiving device. In such an application, it is not, in fact, necessary for the device output the chip key to await for its own functionality to be enabled before it outputs the chip key to the next device.

According to one aspect of the present invention there is provided

BRIEF DESCRIPTION OF THE DRAWINGS

Electronic assemblies embodying the invention, will now be described, by way of non-limiting example, with reference to the accompanying diagrammatic drawings, in which.

BEST MODE OF CARRYING OUT THE INVENTION

Before describing an embodiment of an integrated circuit device provided with chip-key output means for use in the present invention, an integrated circuit device will be described, with reference to FIGS. 1 and 2, that has a functional block controlled by lock circuitry. The integrated circuit device of FIGS. 1 and 2 forms the subject mater of our co-pending European Application filed the same date and entitled "Integrated Circuit Device with Function Usage Control"

Figure 1:
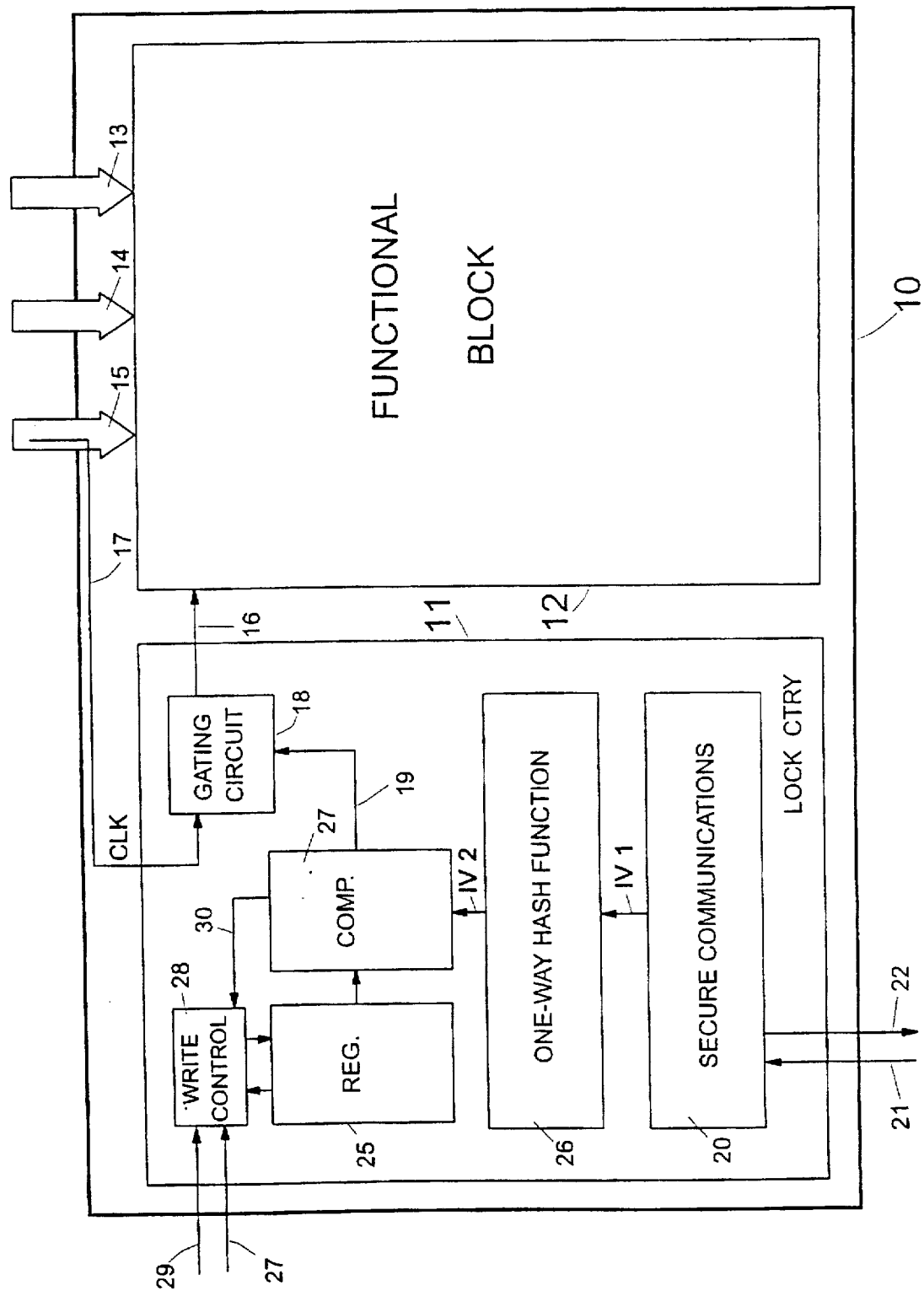
FIG. 1 is a block diagram of an integrated circuit device showing a lock circuitry for controlling enablement of a functional block of the device.

The integrated circuit device 10 (hereinafter "chip") shown in diagrammatic form in FIG. 1 comprises lock circuitry 11 controlling operational enablement of a functional block 12 (FIG. 1 is not intended to accurately represent the relative chip areas occupied by the circuitry 11 and functional block 12). Functional block 12 may, for example, be a data compression engine for compressing/ decompressing externally supplied data, or part of a disk-drive controller.

The functional block 12 is connected to external data, address and control lines 13, 14, 15 through external chip contacts ( not explicitly shown). The block 12 operates in standard manner with the exception that for its operation it needs to be supplied with a signal on line 16 coming from the lock circuitry 11. In the present example, the required signal on line 16 is an external clock signal delivered over control line 17 to a gating circuit 18 of the lock circuitry 11. When the gating circuit is fed with an enable signal on line 19, the external clock signal is passed to the block 12 enabling its operation; in the absence of an enable signal on line 19, the block 12 is internally non-operational.

To unlock the lock circuitry 11 to enable block 12, a predetermined password (chip-key) must be supplied to the lock circuitry 11 from externally of the chip 10. Two particular measures are taken to ensure the confidentiality of this chip-key. First, the chip-key is passed to the chip 10 in encrypted form, the encrypted chip-key being decrypted in the lock circuitry 11. To this end, the lock circuitry comprises a secure communication block 20 that communicates with the outside world over serial input and output lines 21, 22. The block 20 implements, for example, the well-known Diffie-Hellman Key Exchange algorithm (see, for example, "Network and Internetwork Security", p.342, William Stallings, Prentice Hall International, 1995); by operating this public key algorithm with one-time cryptographic keys, a chip-key can be passed to the chip 20 in a confidential manner that is proof against a replay attack.

When the secure communications block 20 is fed with an encrypted chip-key, it decrypts the chip-key and temporarily outputs the chip-key as first intermediate value IV1.

The second measure taken to ensure the confidentiality of the chip-key, is that a copy of the chip-key is not stored as such in chip 10 for comparison against the input chip-key. Instead, a signature of the correct chip-key for the chip concerned is stored in register 25 of the lock circuitry, this signature being a value formed by subjecting the clear form of the chip-key to a one-way function. This one-way function is, for example, a one-way hash function such as effected the Secure Hash Algorithm SHA (see page 276 of the aforesaid reference "Network and Internetwork Security"). Were an intruder able gain access to register 25 in a manner permitting its contents to be read, this would not compromise the chip-key as it would not be computationally feasible to determine the latter from its signature held in register 25.

In order to ascertain whether an input chip-key is the correct one to unlock the particular chip 10 concerned, the lock circuitry further comprises a one-way function block 26 that subjects the chip-key output as IV1 from block 20 to the one-way function (in this case, the SHA) used to form the chip-key signature held in register 25. The resultant intermediate value IV2 output by block 26 is then compared in comparison block 27 with the signature stored in register 25; if a match is found, the comparison block 27 outputs an enable signal on line 19 to cause operational enablement of the functional block 12. The comparison block latches the enable signal in the sense that once this signal is generated, it remains present notwithstanding removal of the correct IV2 value, until the chip is de-energised (or some other condition is achieved).

The chip-key signature stored in register 25 may be set in permanently at the time of manufacture or, as in the present example, written in subsequently (the register in this case being for example, Flash or EEPROM memory). To control this latter process, the chip 10 is provided with a write control circuit 28 interposed between the data lines 14 and the register 25. In order to write to the register 25, the required chip-key signature value is placed on the data lines 14 and a write-enable signal is passed on line 29 to the write control circuit 28. Additionally, the write control circuit 28 is arranged only to enable writing to the register 25 either if its contents are all zeroes (indicating that no chip-key signature has yet been written in) or if the lock circuitry is currently in its unlocked state (as indicated, for example, by the presence of a signal on line 30 from the comparison block 27).

Once the required chip-key signature has been written to the register 25, further writing to the register could be prevented by providing a fusible link in the write control circuitry 28, the link being blown upon application of an appropriate external signal on line 31.

Typically, the chip key in clear form may have a length of 1K bits.

Although in FIG. 1 the chip 10 is shown with only one functional block 12 controlled by the lock circuitry 11, a number of such blocks may be provided typically each with different functionality. Such an arrangement is shown in FIG. 2 for five functional blocks 12A to 12E. In this case a respective gating circuit 18 is associated with each functional block and the register 25 is replaced by a register block 35 storing signatures for a plurality of different chip-keys associated with particular ones of the functional blocks. In FIG. 2, these signatures are designated H(K1) to H(K6), corresponding to the hash of chip-keys K1 to K6 respectively. When presented with an intermediate value IV2, the comparison block 27 now searches for a match amongst the signatures H(K1) to H(K6) stored in register block 35 and upon finding a match takes appropriate action in respect of the associated functional block.

Figure 2:
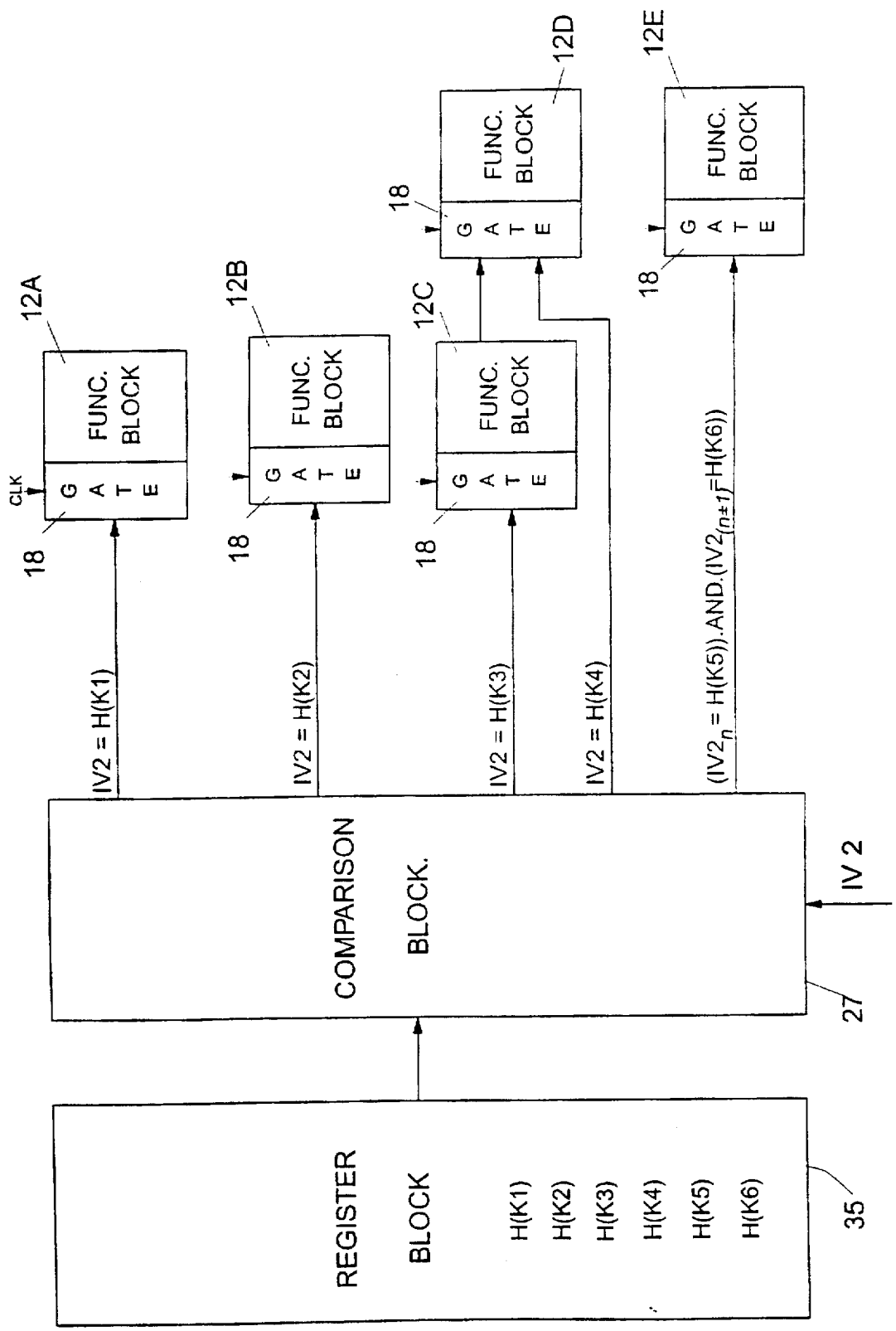
FIG. 2 is a diagram illustrating various arrangements for enabling different functional blocks provided in the same integrated circuit device.

In the FIG. 2 example, for functional blocks 12A, 12B, 12C a single respective signature H(K1), H(K2), H(K3) is stored in register block 35 and upon signal IV2 taking on a corresponding value, the comparison block 27 outputs an enable signal to the appropriate functional block. The functionality of the blocks 12A, 12B and 12C can thus be selectively enabled according to the input chip-key and this permits different functionality to be made available to different users.

The enablement of block 12D is more involved than for blocks 12A,B,C. In this case, not only must signal IV2 take on the correct value corresponding to the stored signature H(K4) for block 12D, but block 12C must also have first been enabled. This is achieved by having the gating circuit 18 associated with the block 12D only enable the latter upon receipt of enable signals both from the comparison block 27 and from the block 12C, the latter only supplying such a signal when itself enabled. This general arrangement permits a hierarchical access scheme to be implemented by which each level has a corresponding chip-key and users can only enable functional blocks up to a level in the hierarchy for which they have the correct chip-keys.

Enablement of functional block 12E requires the input of two encrypted chip-keys K5, K6 (possibly in direct succession), the register block 35 storing the corresponding signatures H(K5), H(K6) of both chip-keys. In this case, the comparison block 27 when identifying a match for a first one of the chip-keys, must remember this fact and await detection of a match for the second one of the chip-keys before outputting an enable signal to the gating circuit 18 associated with functional block 12E.

It will be appreciated that the different approaches described above for enabling blocks 12A-C, block 12D, and block 12E can be used in any desired combination as required. It will also be appreciated that the chip 10 can be provided with one or more functional blocks that are not controlled by the lock circuitry 11, such blocks being unconditionally available for use.

Figure 3:
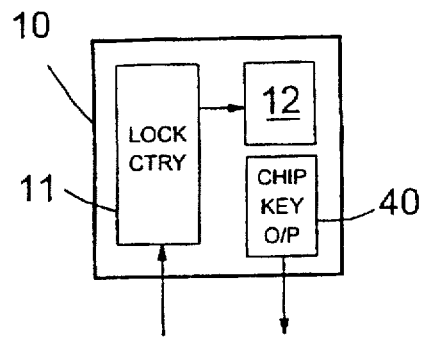
FIG. 3(a) is a diagram of a first embodiment of an integrated circuit device for use in the present invention.
FIG. 3(b) is a diagram of a second embodiment of an integrated circuit device for use in the present invention.
FIG. 3(c) is a diagram of a third embodiment of an integrated circuit device for use in the present invention.
FIG. 3(d) is a diagram of a fourth embodiment of an integrated circuit device for use in the present invention.
Figure 3:
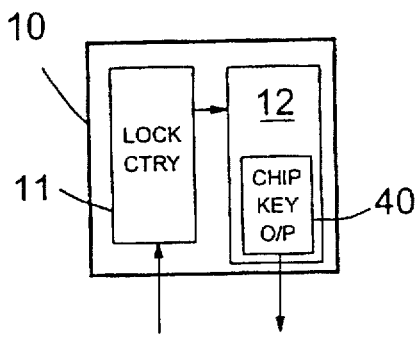
Figure 3:
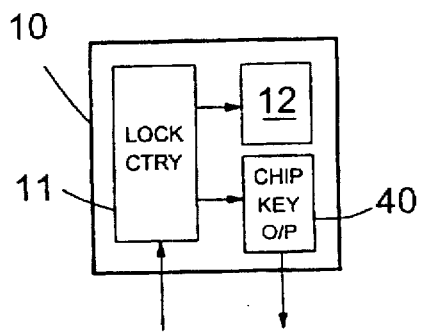
Figure 3:
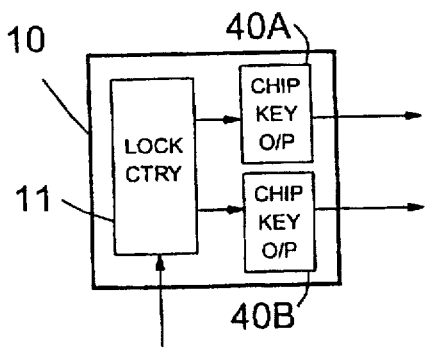

FIG. 3 illustrates four forms of integrated ciruit device 10 for use in the present invention, each including lock circuitry, such as the previously described lock circuitry 11, and a functional block 12 controlled by the lock circuitry. For clarity, in FIG. 3 (and also in FIG. 4) only the input connection to the lock circuitry 11 of each chip 10 has been shown, this connection being represented by a single line (generally, it will be two lines as shown in FIG. 1 as two-way communication is required for the secure communication process operated by the FIG. 1 lock circuitry). Again, for clarity, each chip is shown as having only one main functional block 12 controlled by the lock circuitry 11 (though as will be explained below, a second block 40 may in certain cases also be controlled by the lock circuitry).

Each embodiment shown in FIG. 3 includes a chip-key output ciruit 40 which when enabled is operative to output a chip key associated with another chip. This output may be in encrypted form using a secure communications arrangement (such as employed in the FIG. 1 lock circuitry) or may use a lower level of security, depending on application.

FIG. 3(a) shows a first form of chip 10 for use in the present invention, in which the chip-key output circuit 40 is independent of the lock circuitry 11, being enabled immediately upon energisation of the device and triggered to output its chip key by an external signal such as a reset signal.

FIG. 3(b) shows a second form of chip 10 for use in the present invention in which the chip-key output circuit 40 forms part (or possibly all) of the functional block 12 controlled by the lock circuitry 12. In this embodiment, upon the functional block 12 becoming enabled, the chip-key output circuit 40 outputs its chip key.

FIG. 3(c) shows a third form of chip 10 for use in the present invention in which the chip-key output circuit 40 forms a functional block controlled by the lock circuitry 12 separately from the main functional block of the chip; in this case, the block 12 and circuit 40 may become enabled by the receipt of different chip keys by the lock circuitry. Upon the chip-key output circuit 40 becoming enabled, it outputs its chip key.

FIG. 3(d) shows a fourth form of chip 10 for use in the present invention in which two chip-key output circuits 40 are provided, each controlled as a functional block by the lock circuitry 12 such as to become enabled by the receipt of different chip keys by the lock circuitry. Upon either chip-key output circuit 40 becoming enabled, it outputs its chip key (the chip keys output by each circuit 40 will genreally be different).

It will be appreciated that variants of the FIG. 3 chip forms are possible; for example, in FIG. 3(d) chip, more than two chip-key output circuits could be provided and each may form part of a block 12 possessing additional functionality.

Figure 4:
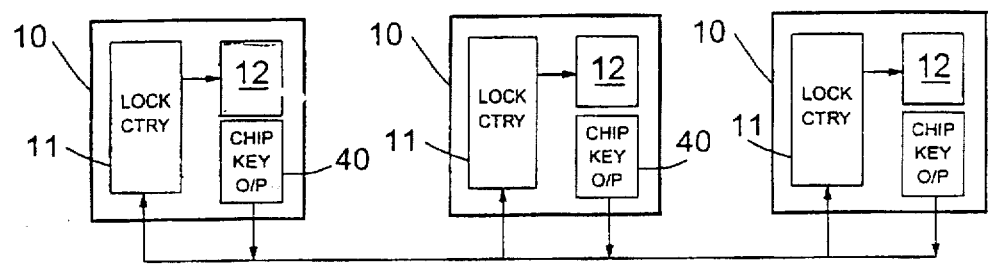
FIG. 4(a) is a diagram of a first electronic assembly with an arrangement of integrated circuit devices of the FIG. 3(a) form that serves to inhibit operation of functional blocks of all devices if any device is missing.
FIG. 4(b) is a diagram of a second electronic assembly with a one-to-many arrangement of integrated circuit devices with the "one" device being of the FIG. 3(b) form.
FIG. 4(c) is a diagram of a third electronic assembly with a chain arrangement of integrated circuit devices with the device at the head of the chain being of the FIG. 3(b) form.
FIG. 4(d) is a diagram of a fourth electronic assembly in which an integrated circuit device of the FIG. 3(d) form controls two futher integrated circuit devices.
Figure 4:
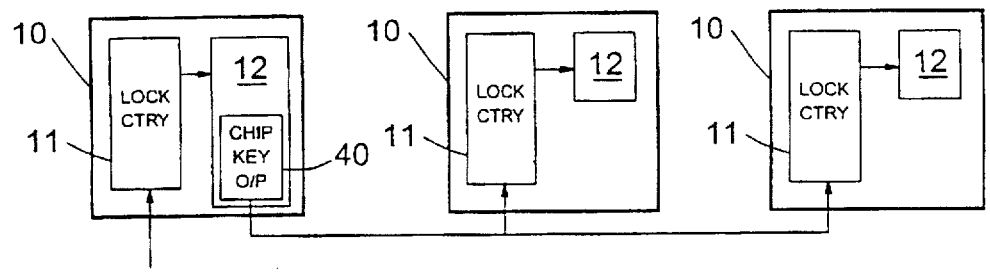
Figure 4:
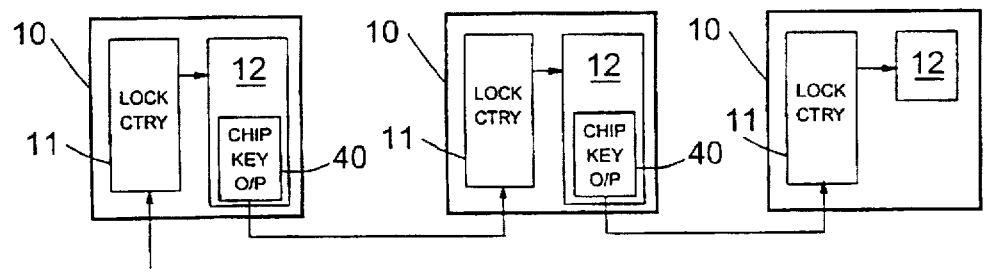
Figure 4:
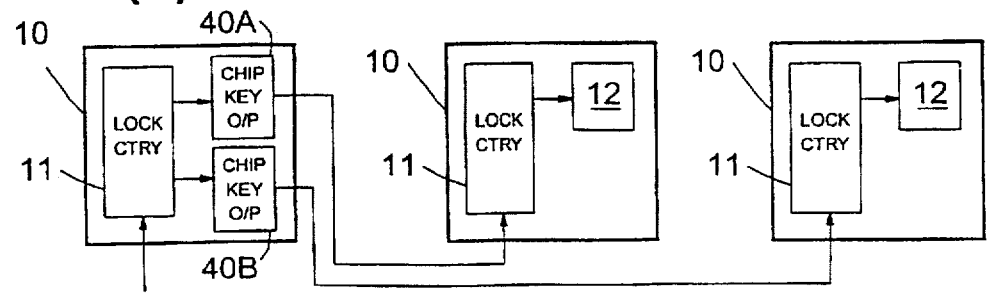

FIG. 4 shows four possible arrangments of the FIG. 3 chips in an electronic assembly, these arrangments being merely illustrative of the wide range of possible arrangements.

In the FIG. 4(a) arrangement, three chips 10 of the FIG. 3(a) form each have their lock circuitry arranged to receive the chip keys output by the circuits of the other two chips. The lock circuitry 11 of each chip is such that it requires the chip keys from the other chips before it enables the associated functional block 12. With such an arrangment, the absence of any one chip prevents the functional blocks of the other chips from being enabled. The chip keys can be chosen to be specific to particular chips or particular chip types.

In the FIG. 4(b) arrangement, a chip of the FIG. 3(b) form is used to enable two further chips. These further chips need not themselves be provided with a chip-key output circuit (though, of course, such functionality could be present). This arrangement provides a one-to-many enablement arrangement.

In the FIG. 4(c) arrangement, a first chip of the FIG. 3(b) form is arranged to output a chip key to enable the functional block of a second chip also of the FIG. 3(b) form; this latter chip is in turn arranged to output a chip key for enabling the functional block of another chip. This arrangement provides a chain of enablement that can be extended as required.

The FIG. 3(c) form of chip could be used in place of the FIG. 3(b) form of chip in both the FIG. 4(b) and FIG. 4(c) arrangements. In the FIG. 4(d) arrangement, a chip of the FIG. 3(d) form is used to independently enable two further chips in dependence on the receipt of the appropriate chip key by the lock circuitry of the FIG. 3(d) chip.

It will be appreciated that in the foregoing FIG. 4 arrangments, where different chip keys are to be passed to different chips, this can be done over the same communication lines since passing a chip key to a chip for which it is not intended simply means that the chip will fail to respond. Of course, appropriate measures would be needed for sharing a common communication link.

In all of the FIG. 4 arrangements, the master or head chip (the leftmost chip) may be supplied with a chip key over a communications link or from a local input device such as a smart card reader.

It will be appreciated that various modifications may be made to the described embodiments of the present invention. For example, the lock circuitry may differ from that described with respect to FIG. 1 depending on the level of security required; in some applications, for example, it may be acceptable simply to store the password in clear in the chip and even to omit the secure communications means. In fact for the arrangements shown in FIGS. 4(b) to 4(d), a preferred option is to provide the head chip (the leftmost chip) with lock circuitry of the FIG. 1 form whilst using less secure arrangements for the other chips. For the FIG. 4(a) arrangement, lock circuitry of a lower level of security than offered by the Figure lock circuitry will generally be appropriate. The chip-key output means 40 has its security level matched to that of the lock circuitry with which it interfaces.

I claim:

1. An electronic assembly positioned within a computer case, said electronic assembly including a plurality of integrated circuit devices, a first one of said devices comprising:

a functional block for providing the device with a required functionality, lock circuitry for inhibiting operation of said functional block until the provision to the lock circuitry, from externally of the device, of at least one predetermined chip key, and chip key output means for outputting a chip key associated with another said device;

and a second one of said devices being connected to receive the said chip key output by the said chip-key output means of said devices, said second one of said devices comprising:

a functional block for providing said second one of said devices with a required functionality, and lock circuitry for inhibiting operation of said functional block of said second one of said devices until the provision to the lock circuitry of said chip key from said first one of said devices.

2. An electronic assembly according to claim 1, wherein for said first one of said devices, said chip-key output means is independent of said lock circuitry.

3. An electronic assembly according to claim 1, wherein for said first one of said devices, said functional block controlled by the lock circuitry comprises said chip-key output means.

4. An electronic assembly according to claim 3, wherein said first one of said devices comprising at least two said functional blocks each comprising a respective said chip-key output means for outputting respective chip keys when the functional block ceases to be inhibited by said lock circuitry, there being at least two said second ones of said devices to which are passed respective ones of said chip keys output by the said first one of said devices.

5. An electronic assembly according to claim 2, including a plurality of said second ones of said devices each connected to receive the chip key output by said first one of the devices.

6. An electronic assembly according to claim 3, wherein the said functional block of said second one of the devices includes chip-key output means for outputting a respective chip key when the functional block ceases to be inhibited by said lock circuitry, a third one of said devices being connected to receive the said chip key output by the said chip-key output means of said second one of said devices, and said third one of said devices comprising:

a functional block for providing that device with a required functionality, and lock circuitry for inhibiting operation of said functional block of the same device until the provision to the lock circuitry of said chip key from said second one of said devices.

7. An electronic assembly according to claim 1, wherein the lock circuitry of said first device comprises:

storage means for storing at least one reference value, secure communication means for receiving an input from externally of the device and for subjecting that input to a decryption process to produce a first intermediate value, the nature of said decryption process being such that said first intermediate value corresponds to the clear form of a said chip key when said input is that key in encrypted form, means for receiving said first intermediate value and for performing a one-way function on it to produce a second intermediate value, comparison means for detecting a match between said second intermediate value and a said at least one reference value, and for producing a corresponding enable signal when at least one said match has been detected, and inhibit means for inhibiting operation of the or each said functional block until the corresponding said enable signal is produced.

8. A device according to claim 1, wherein the said chip-key output means of said first device is such that the said chip key output thereby is output in encrypted form, the lock circuitry of the second device including means for decrypting the chip key on receipt.

9. An electronic assembly according to claim 3, including a plurality of said second ones of said devices, each connected to receive the chip key output by said one of the devices.

* * * * *